(12) United States Patent
Shu

(10) Patent No.: US 10,307,896 B2
(45) Date of Patent: Jun. 4, 2019

(54) SLEEVE DEVICE FOR RECEIVING BITS

(71) Applicant: Zu-Shung Shu, Taichung (TW)

(72) Inventor: Zu-Shung Shu, Taichung (TW)

( * ) Notice: Subject to any disclaimer, the term of this patent is extended or adjusted under 35 U.S.C. 154(b) by 0 days.

(21) Appl. No.: 15/800,277

(22) Filed: Nov. 1, 2017

(65) Prior Publication Data
US 2018/0185995 A1    Jul. 5, 2018

(30) Foreign Application Priority Data
Dec. 30, 2016 (TW) .............................. 105144093 A

(51) Int. Cl.
B25B 23/00 (2006.01)
B23B 31/107 (2006.01)
B25B 23/12 (2006.01)

(52) U.S. Cl.
CPC ........ *B25B 23/0035* (2013.01); *B23B 31/107* (2013.01); *B23B 2231/04* (2013.01); *B25B 23/12* (2013.01); *Y10S 279/904* (2013.01); *Y10T 279/17761* (2015.01); *Y10T 279/17811* (2015.01); *Y10T 279/3406* (2015.01)

(58) Field of Classification Search
CPC .............. B25B 23/0035; B23B 31/107; B23B 31/1071; B23B 31/1072; B23B 2231/04; Y10S 279/904; Y10T 279/17761; Y10T 279/17811; Y10T 279/3406
See application file for complete search history.

(56) References Cited

U.S. PATENT DOCUMENTS

| 5,013,194 A * | 5/1991 | Wienhold | B23B 31/1071 279/22 |
| 5,437,212 A * | 8/1995 | Thompson | B25B 13/463 81/63.1 |
| 6,966,562 B1 * | 11/2005 | Wienhold | B23B 31/1071 279/155 |
| 7,261,021 B1 * | 8/2007 | Carnesi | B25B 13/44 279/71 |
| 7,491,020 B2 * | 2/2009 | Gehret | B23B 31/1238 279/134 |
| 7,896,355 B2 * | 3/2011 | Wienhold | B23B 31/1071 279/22 |
| 7,922,180 B2 * | 4/2011 | Meng | B25B 15/001 279/143 |

(Continued)

Primary Examiner — Eric A Gates
(74) Attorney, Agent, or Firm — Alan D. Kamrath; Mayer & Williams PC

(57) ABSTRACT

A sleeve device includes a main unit having a sleeve with an open end face, a receiving space intercommunicating with the open end face, and a radial hole. An engaging member extends into the receiving space. A fixing member is mounted to an end of the receiving space opposite to the open end face. A pressing member is slideably received in the receiving space for pressing against the fixing member. The pressing member includes a cylindrical portion, an abutting portion, and a pressing portion, with the abutting portion and the pressing portion disposed on two ends of the cylindrical portion. A positioning member is slideably received in the radial hole for selectively pressing against an outer periphery of the cylindrical portion or the pressing portion. A ring is rotatably mounted around the sleeve and includes an inner periphery and a first recessed portion for selectively abutting the positioning member.

15 Claims, 14 Drawing Sheets

(56) References Cited

U.S. PATENT DOCUMENTS

| | | | | |
|---|---|---|---|---|
| 8,122,791 B2* | 2/2012 | Klomp | ................... | B25B 13/463 |
| | | | | 192/43.2 |
| 8,690,164 B2* | 4/2014 | Meng | ................... | B25B 23/0035 |
| | | | | 279/155 |
| 8,876,120 B2* | 11/2014 | Chen | ..................... | B25B 15/001 |
| | | | | 279/128 |
| 9,101,987 B2* | 8/2015 | Cornwell | ............... | B23B 31/107 |
| 9,156,147 B2* | 10/2015 | Peters | ..................... | B23B 31/10 |
| 9,381,627 B2* | 7/2016 | Chen | ................... | B25B 23/0035 |
| 9,561,581 B2* | 2/2017 | Chen | ................... | B25B 23/0035 |
| 9,873,155 B1* | 1/2018 | Wienhold | ........... | B23B 31/1071 |
| 2006/0145431 A1* | 7/2006 | Chang | ................... | B25B 15/001 |
| | | | | 279/74 |
| 2011/0023666 A1* | 2/2011 | Hsu | ..................... | B25B 23/0035 |
| | | | | 81/438 |
| 2015/0196996 A1* | 7/2015 | Nelson | .................... | B25B 15/04 |
| | | | | 81/63.1 |
| 2015/0202751 A1* | 7/2015 | Chen | ................... | B25B 23/0035 |
| | | | | 279/9.1 |
| 2018/0318990 A1* | 11/2018 | Chuang | ............... | B25B 23/0035 |

* cited by examiner

SLEEVE DEVICE FOR RECEIVING BITS

BACKGROUND OF THE INVENTION

The present invention relates to a sleeve device for receiving bits and, more particularly, to a sleeve device for receiving bits of different types.

Conventional sleeves can only receive screwdriver bits of the same specification and, thus, cannot provide use convenience.

BRIEF SUMMARY OF THE INVENTION

A sleeve device for receiving bits according to the present invention includes a main unit having a sleeve and an engaging member. The sleeve includes an inner periphery defining a receiving space extending along a first axis. The sleeve includes a first end having an open end face intercommunicating with the receiving space. The sleeve further includes a radial hole extending from the inner periphery through an outer periphery of the sleeve in a radial direction perpendicular to the first axis and intercommunicating with the receiving space. A bit is adapted to extend through the open end face into the receiving space. The engaging member extends into the first end of the sleeve and is configured to engage with the bit. A fixing member is mounted to an end of the receiving space opposite to the open end face. A pressing member is slideably received in the receiving space. The pressing member is configured to press against the fixing member. The pressing member includes a cylindrical portion, an abutting portion, and a pressing portion. The abutting portion and the pressing portion are disposed on two opposite ends of the cylindrical portion. The abutting portion faces the open end face and is configured to abut the bit. A positioning member is slideably received in the radial hole. The positioning member is configured to selectively press against an outer periphery of the cylindrical portion or the pressing portion. A ring is rotatably mounted around the sleeve. The ring includes an inner periphery and a first recessed portion provided on the inner periphery. The inner periphery and the first recessed portion are capable of abutting the positioning member.

The sleeve device is switchable between a first position and a second position. When the sleeve device is in the first position, the first recessed portion of the ring covers the radial hole, the positioning member is pressed by the first recessed portion to press against the outer periphery of the cylindrical portion of the pressing member. An end of the pressing member adjacent to the pressing portion presses against the fixing member. The abutting portion and the engaging member have a first engagement depth therebetween.

When the sleeve device is in the second position, the inner periphery of the ring covers the radial hole, and the positioning member is pressed by the inner periphery of the ring to press against the pressing portion. The abutting portion and the engaging member have a second engagement depth therebetween. The first engagement depth is larger than the first engagement depth.

In an example, the pressing member includes a groove defined in the outer periphery of the cylindrical portion and located between the abutting portion and the pressing portion. The ring further includes a second recessed portion. The second recessed portion is disposed on the inner periphery and is configured to press against the positioning member. The first recessed portion includes a first depth to the inner periphery of the ring in a radial direction perpendicular to the first axis. The second recessed portion includes a second depth to the inner periphery of the ring in a radial direction perpendicular to the first axis. The first depth is larger than the second depth.

The sleeve device is switchable between the first position, the second position and a third position. When the sleeve device is in the third position, the second recessed portion of the ring covers the radial hole, and the positioning member is pressed by the second recessed portion of the ring to engage with the groove of the pressing member. The abutting portion and the engaging member have a third engagement depth therebetween. The third engagement depth is smaller than the first engagement depth and is larger than the second engagement depth.

In an example, the ring further includes a first groove, a second groove, and a third groove. The first, second, and third grooves extend in a longitudinal direction of the ring. The sleeve includes a positioning pin. The ring is rotatable relative to the sleeve to selectively engage the positioning pin in one of the first, second, and third grooves. The positioning pin is received in the first groove when the sleeve device is in the first position. The positioning pin is received in the second groove when the sleeve device is in the second position. The positioning pin is received in the third groove when the sleeve device is in the third position.

In an example, the main unit further includes a sliding member, a positioning ring, and a first elastic element. The sliding member is slideably mounted around the sleeve. The positioning ring is coupled to the outer periphery of the sleeve and is located at an end of the sliding member distant to the ring. The first elastic element is mounted around the sleeve and is located between the sliding member and the ring. The first elastic element elastically presses against the sliding member and the ring. The ring elastically presses against the positioning pin. The sliding member elastically presses against the positioning ring.

In an example, the sleeve includes a guiding slot intercommunicating with the receiving space and extending along a second axis at an angle to the first axis. The angle is smaller than 90°. The engaging member slideably abuts a wall of the guiding groove and extends into the receiving space.

In an example, the main unit further includes a jacket and a second elastic element. The jacket includes an inner periphery defining a through-hole and a shoulder. The through-hole extends from an end through the other end of the jacket and slideably receives the sleeve. The shoulder is provided on the inner periphery of the jacket and abuts the outer periphery of the sleeve. The shoulder is configured to slide the engaging member relative to the guiding slot. The second elastic element is mounted around the sleeve and is received in the through-hole of the jacket. The second elastic element elastically presses against the shoulder. The sliding member is received in an end of the through-hole opposite to the shoulder.

In an example, the sliding member includes a receiving groove surrounds the outer periphery of the sleeve. An end of the sliding member adjacent to the receiving groove is configured to press against the ring. The first elastic element is received in the receiving groove. The main unit further includes a third elastic element. The third elastic element is received in the receiving space of the sleeve and is located between the pressing member and the fixing member. The third elastic element elastically presses against the pressing member.

In an example, the sleeve further includes a second end. The receiving space extends from the first end through the second end of the sleeve. The fixing member is a rod extending into the receiving space. The fixing member is configured to couple with a tool and includes a projection extending toward the pressing member. The third elastic element is mounted around the projection. The cylindrical portion of the pressing member is configured to receive the projection.

In an example, the sleeve includes a ratcheting portion mounted to a second end of the sleeve opposite to the first end of the sleeve. The main unit includes a ratcheting member coupled to the ratcheting portion and configured to rotate relative to the sleeve. The ratcheting member is configured to couple with a tool.

The present invention will become clearer in light of the following detailed description of illustrative embodiments of this invention described in connection with the drawings.

DETAILED DESCRIPTION OF THE INVENTION

Figure 1:
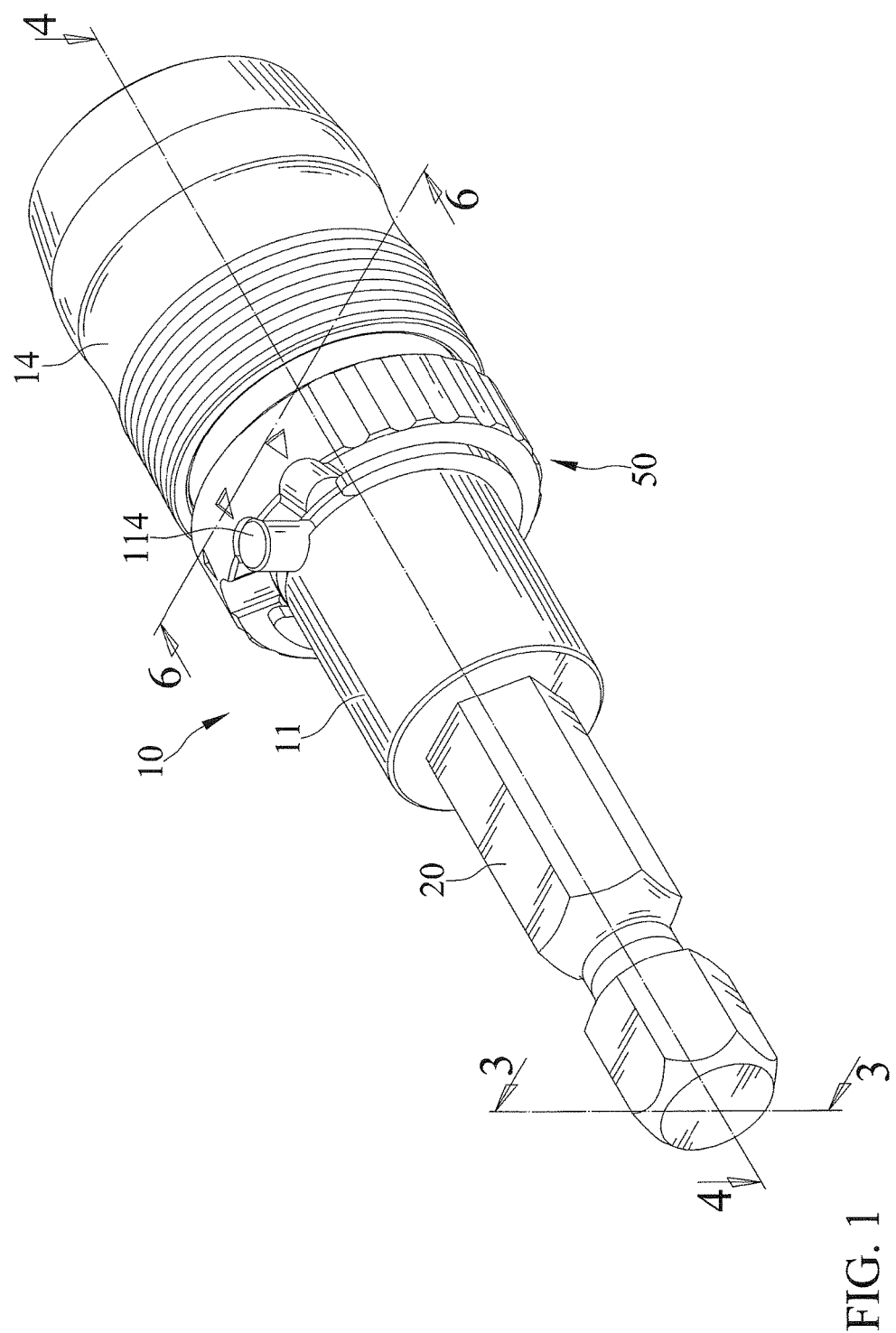
FIG. 1 is a perspective view of a sleeve device for receiving bits of a first embodiment according to the present invention, with sleeve device being in a first position.
Figure 2:
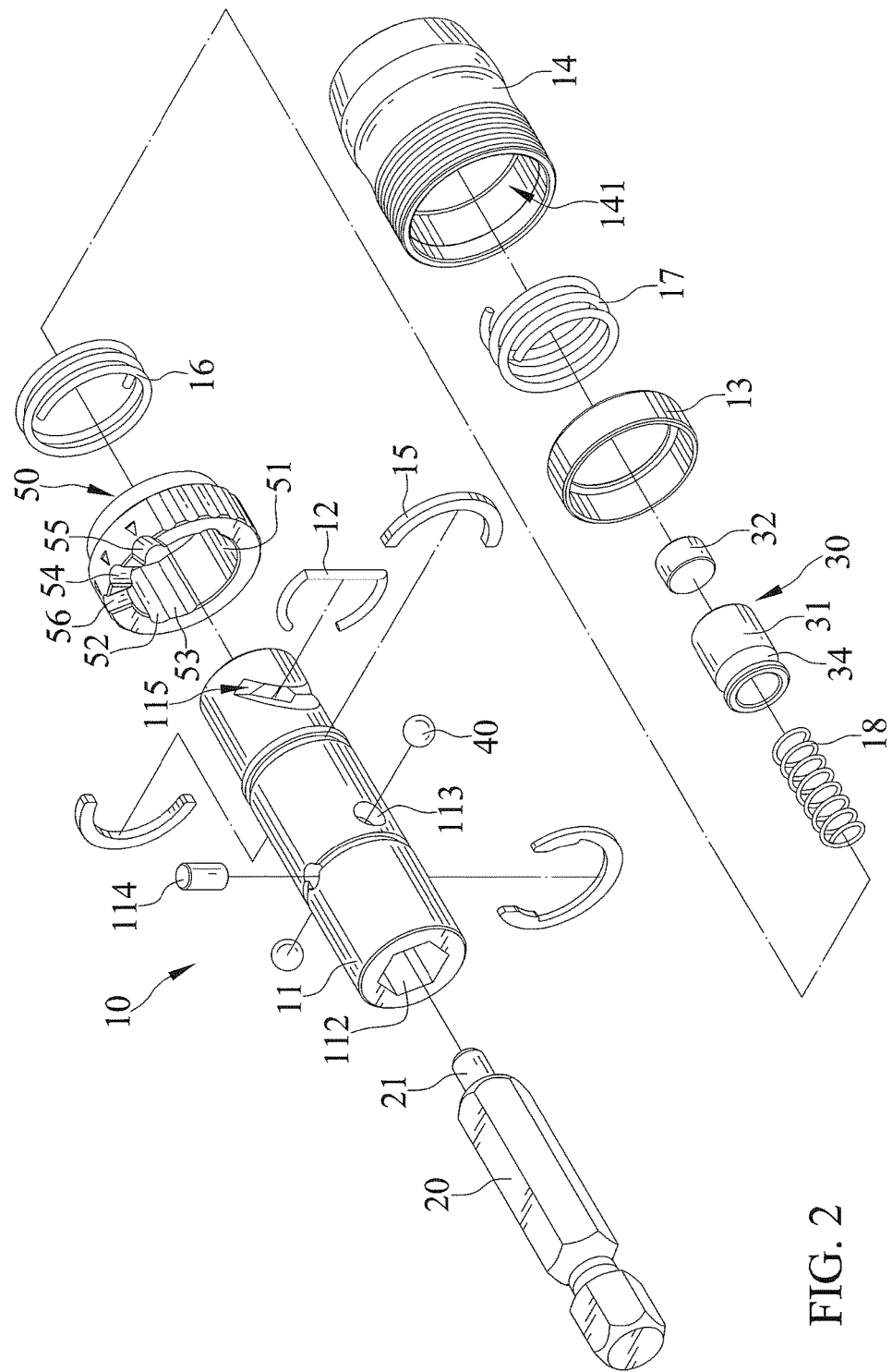
FIG. 2 is an exploded, perspective view of the sleeve device of FIG. 1.
Figure 3:
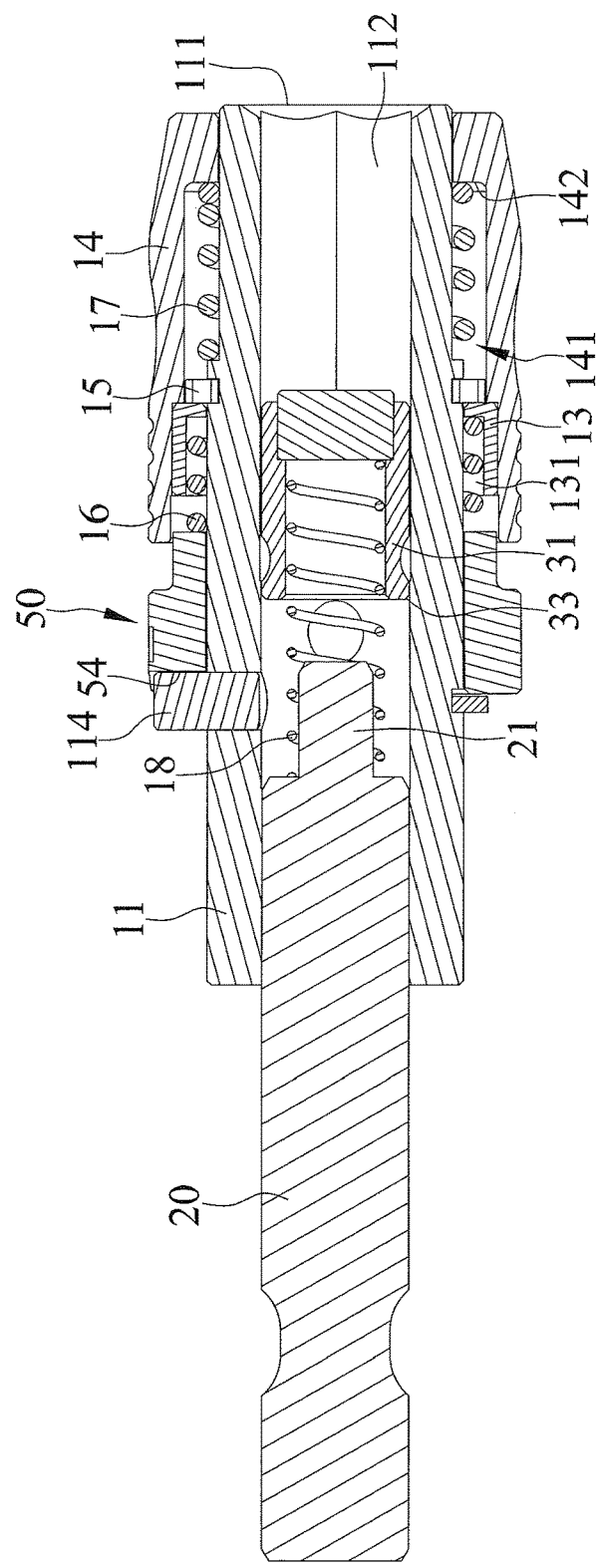
FIG. 3 is a cross sectional view taken along section line 3-3 of FIG. 1.
Figure 4:
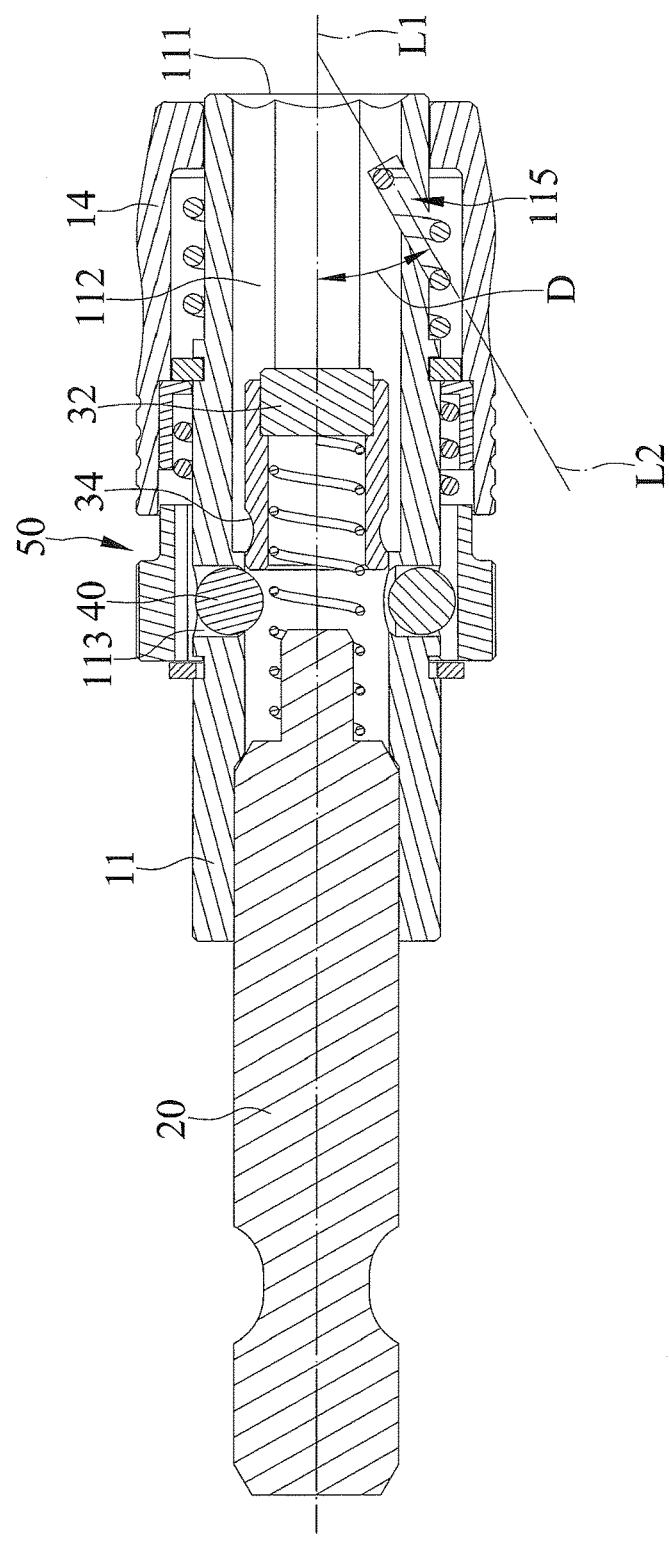
FIG. 4 is a cross sectional view taken along section line 4-4 of FIG. 1.
Figure 5:
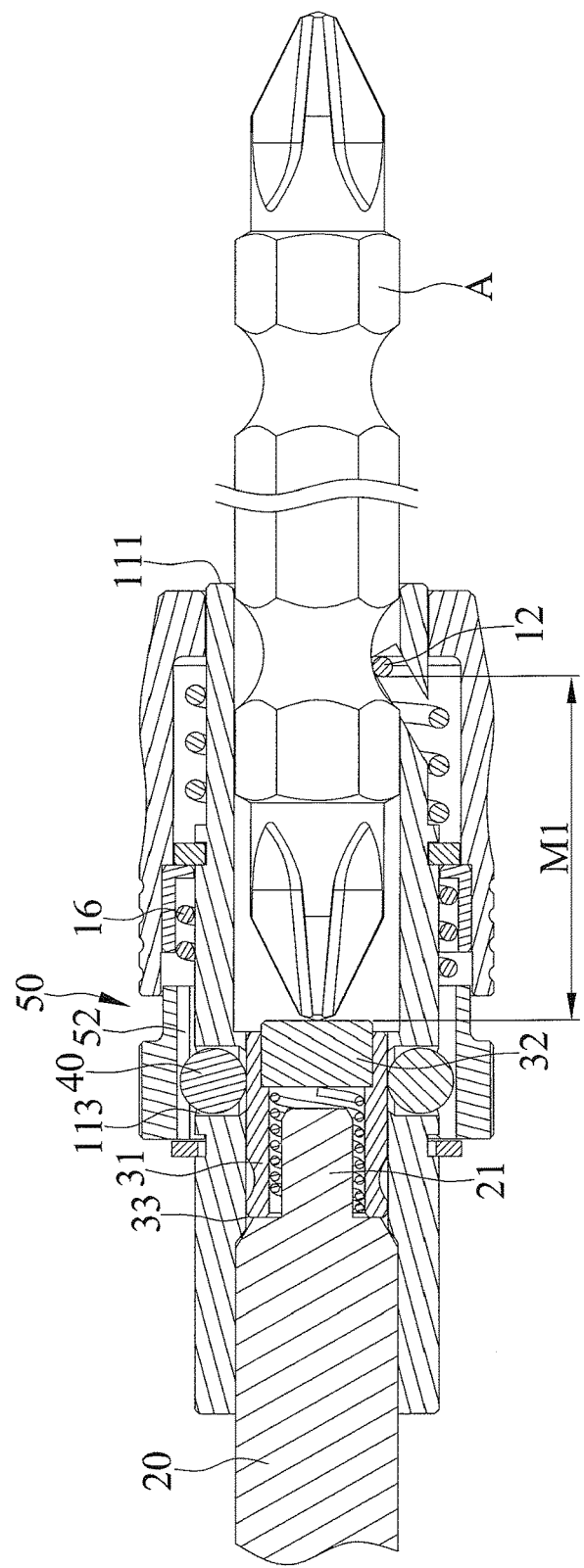
FIG. 5 is a cross sectional view similar to FIG. 4, with a first bit coupled with the sleeve device.
Figure 6:
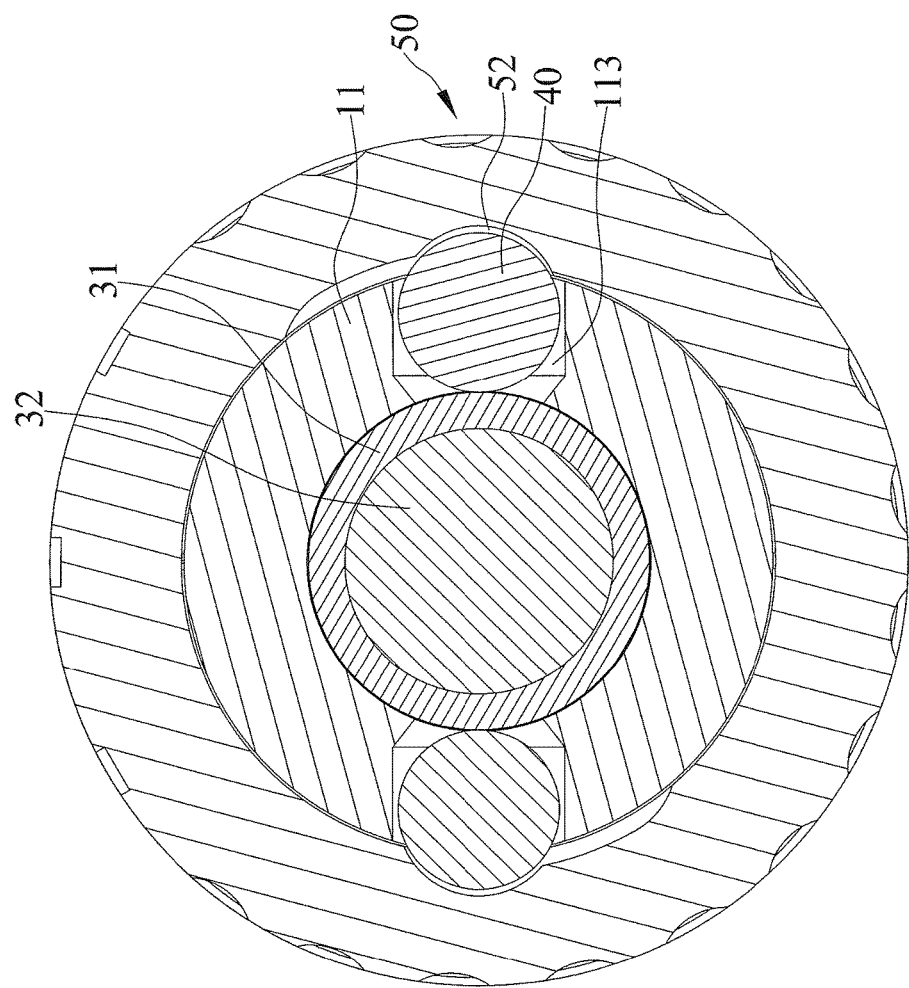
FIG. 6 is a cross sectional view taken along section line 6-6 of FIG. 1, with the first bit coupled with the sleeve device.
Figure 7:
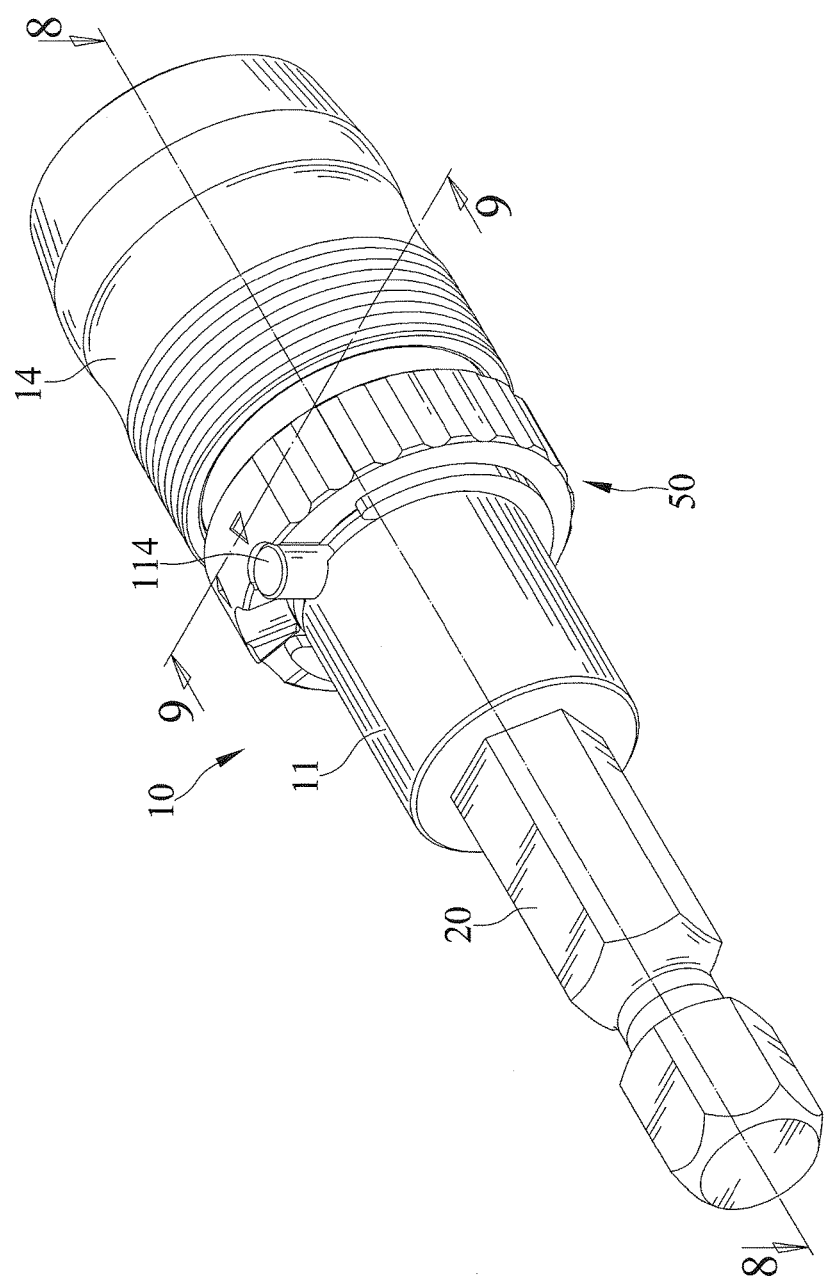
FIG. 7 is a perspective view of the sleeve device of FIG. 1, with the sleeve device being in a second position.
Figure 8:
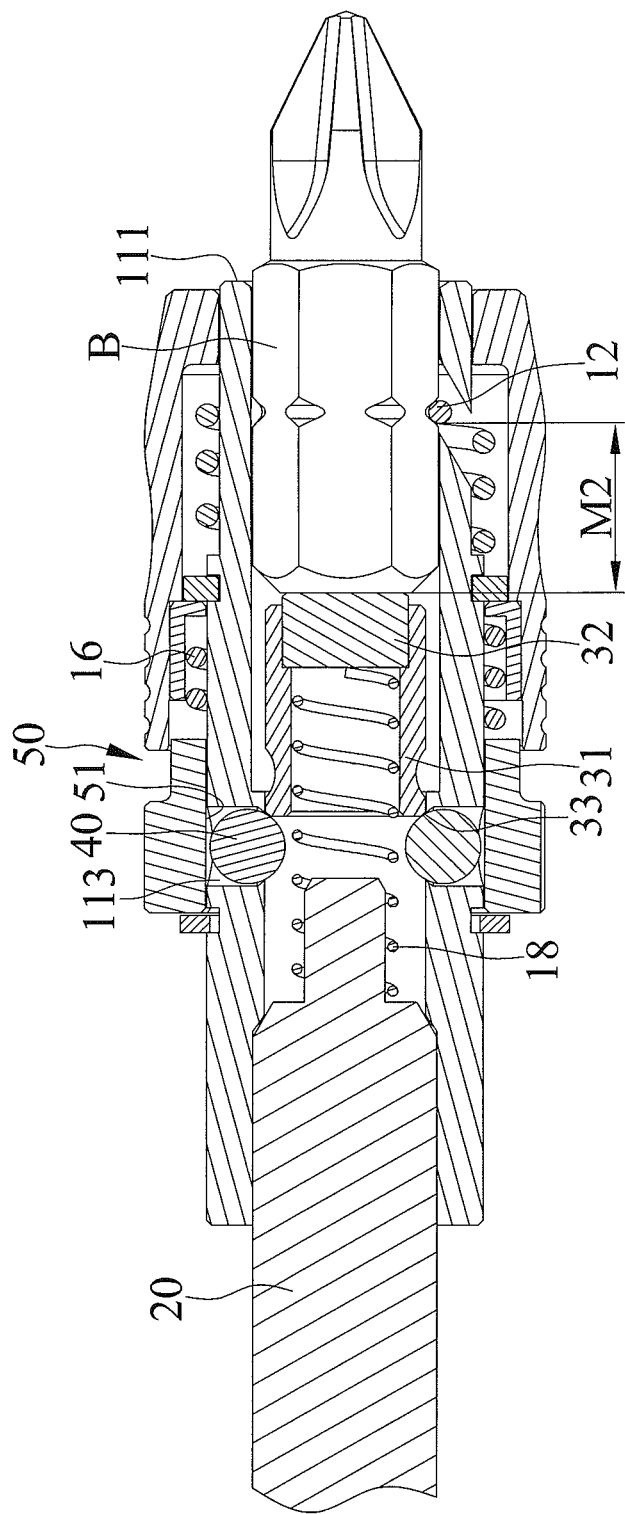
FIG. 8 is a cross sectional view taken along section line 8-8 of FIG. 7.
Figure 9:
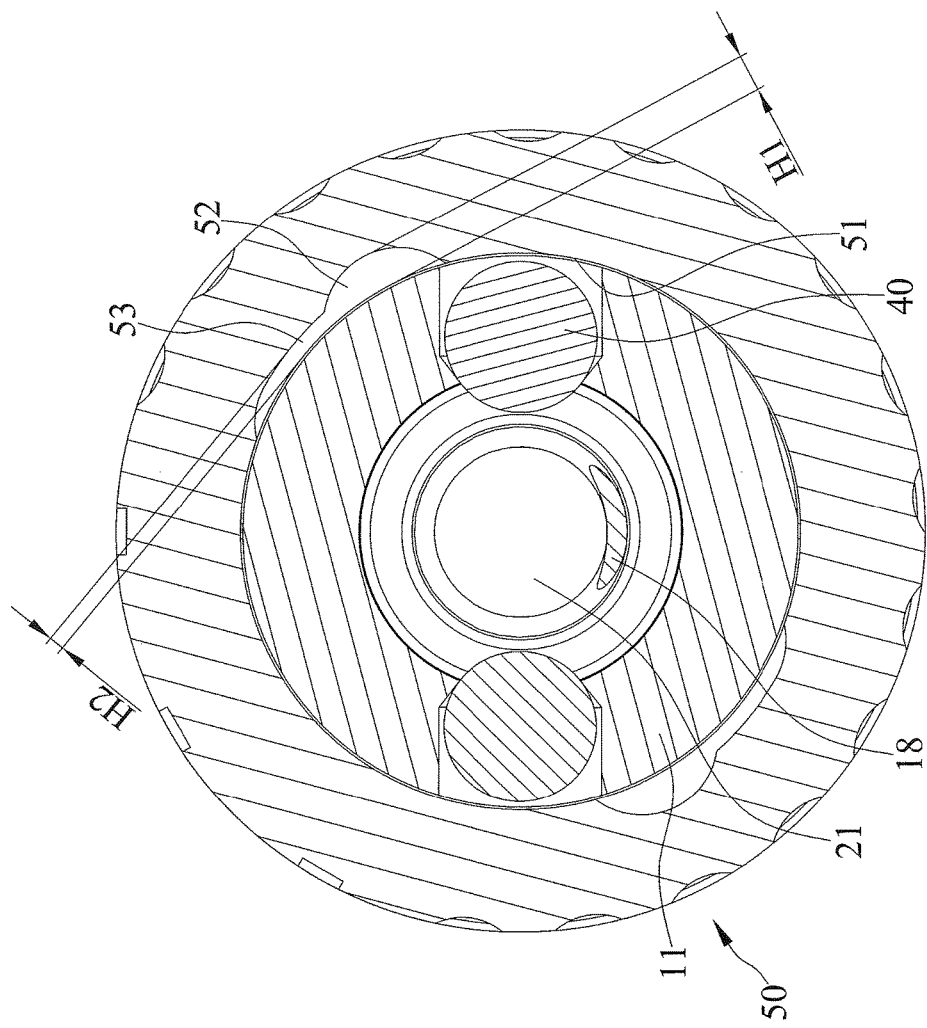
FIG. 9 is a cross sectional view taken along section line 9-9 of FIG. 7.

With reference to FIGS. 1-4 and 9, a sleeve device for receiving bits of a first embodiment according to the present invention includes a main unit 10, a fixing member 20, a pressing member 30, at least one positioning member 40, and a ring 50. The fixing member 20 is coupled to the main unit 10. The pressing member 30 is slideably received in the main unit 10. The at least one positioning member 40 is received in the main unit 10 and is configured to press against the pressing member 30. The ring 50 is mounted around the main unit 10 and presses against the at least one positioning member 40. The main unit 10 can receive a bit.

The main unit 10 includes a sleeve 11, an engaging member 12, a sliding member 13, a jacket 14, a positioning ring 15, a first elastic element 16, a second elastic element 17, and a third elastic element 18. The sleeve 11 can receive a bit. The engaging member 12 is mounted to an end of the sleeve 11 and can engage with the bit. The sliding member 13 is slideably mounted around the sleeve 11. The jacket 14 is slideably mounted around the sleeve 11 and receives the sliding member 13. The positioning ring 15 is securely mounted around an outer periphery of the sleeve 11 and is located at an end of the sliding member 13 distant to the ring 50. The first elastic element 16 is mounted around the sleeve 11 and is located between the sliding member 13 and the ring 50. The first elastic element 16 elastically presses against the sliding member 13 and the ring 50. The sliding member 13 elastically presses against the positioning ring 15. The second elastic element 17 is mounted around the sleeve 11 and is received in the jacket 14. The second elastic element 17 elastically presses against the jacket 14. The third elastic element 18 is received in the sleeve 11 and is located between the pressing member 30 and the fixing member 20. The third elastic element 18 elastically presses against the pressing member 30.

The sleeve 11 includes an inner periphery defining a receiving space 112 extending along a first axis L1. The sleeve 11 includes a first end having an open end face 111 intercommunicating with the receiving space 112. The sleeve 11 further includes at least one radial hole 113 extending from the inner periphery through an outer periphery of the sleeve 11 in a radial direction perpendicular to the first axis L1 and intercommunicating with the receiving space 112. A bit is adapted to extend through the open end face 111 into the receiving space 112. The engaging member 12 extends into the first end of the sleeve 11 and is configured to engage with the bit. The sleeve 11 further includes a positioning pin 114 protruding out of the outer periphery of the sleeve 11. The ring 50 elastically presses against the positioning pin 114. The sleeve 11 further includes a guiding slot 115 intercommunicating with the receiving space 112 and extending along a second axis L2 at an angle D to the first axis L1. The angle D is smaller than 90°. The engaging member 12 slideably abuts a wall of the guiding groove 115 and extends into the receiving space 112. In this embodiment, the sleeve 11 further includes a second end opposite to the first end having the open end face 111, and the receiving space 112 extends from the first end through the second end of the sleeve 11. The at least one radial hole 113 includes two radial holes 113 located on two opposite sides of the receiving space 112.

The sliding member 13 includes a receiving groove 131 surrounding the outer periphery of the sleeve 11. An end of the sliding member 13 adjacent to the receiving groove 131 is configured to press against the ring 50. The first elastic element 16 is received in the receiving groove 131. In this embodiment, the sliding member 13 is processed by a punching machine to form the receiving groove 131, which is more convenient and rapid.

The jacket 14 includes an inner periphery defining a through-hole 141 and a shoulder 142. The through-hole 141 extends from an end through the other end of the jacket 14 and slideably receives the sleeve 11. The shoulder 142 is provided on the inner periphery of the jacket 14 and abuts the outer periphery of the sleeve 11. The shoulder 142 is configured to slide the engaging member 12 relative to the guiding slot 115. The second elastic element 17 is received in the through-hole 141 of the jacket 14 and elastically presses against the shoulder 142. The sliding member 13 is received in an end of the through-hole 141 opposite to the shoulder 142.

The fixing member 20 is mounted to an end of the receiving space 112 opposite to the open end face 111. The fixing member 20 includes a projection 21 extending toward the pressing member 30. The third elastic element 18 is mounted around the projection 21. In this embodiment, the fixing member 20 is a rod extending into the receiving space 112 and is configured to couple with a tool.

The pressing member 30 is slideably received in the receiving space 112 and is configured to press against the fixing member 20. The pressing member 30 includes a cylindrical portion 31, an abutting portion 32, a pressing portion 33, and a groove 34. The abutting portion 32 and the pressing portion 33 are disposed on two opposite ends of the cylindrical portion 31. The abutting portion 32 faces the open end face 111 and is configured to abut the bit. The groove 34 is defined in an outer periphery of the cylindrical portion 31 and is located between the abutting portion 32 and the pressing portion 33. The cylindrical portion 31 can receive the projection 21. In this embodiment, the abutting portion 32 is magnetic to attract the bit.

The at least one positioning member 40 is slideably received in the at least one radial hole 113 and is configured to selectively press against the outer periphery of the cylindrical portion 31 or the pressing portion 33. In this embodiment, the at least one positioning member 40 includes two positioning members 40 in the form of balls respectively received in the two radial holes 113.

The ring 50 is rotatably mounted around the sleeve 11. The ring 50 includes an inner periphery 51, at least one first recessed portion 52, at least one second recessed portion 53, a first groove 54, a second groove 55, and a third groove 56. The at least one first recessed portion 52 is provided on the inner periphery 51. The inner periphery 51 and the at least one first recessed portion 52 can abut the positioning member 40. The second recessed portion 53 is disposed on the inner periphery 51 and can press against the positioning member 40. The at least one first recessed portion 52 includes a first depth H1 to the inner periphery of the ring 50 in a radial direction perpendicular to the first axis L1. The at least one second recessed portion 53 includes a second depth H2 to the inner periphery 51 of the ring 50 in a radial direction perpendicular to the first axis L1. The first depth H1 is larger than the second depth H2. The first, second, and third grooves 54, 55, and 56 extend in a longitudinal direction of the ring 50. The ring 50 is rotatable relative to the sleeve 11 to selectively engage the positioning pin 114 in one of the first, second, and third grooves 54, 55, and 56. In this embodiment, the at least one first recessed portion 52 includes two first recessed portions 52 respectively located on two opposite sides of the ring 50 and facing each other, and the at least one second recessed portion 53 includes two second recessed portions 53 respectively on two opposite sides of the ring 50 and facing each other. One of the two positioning members 40 can be pressed by the inner periphery 51, one of the two first recessed portions 51, or one of the two second recessed portions 52. The other positioning member 40 can be pressed by the inner periphery 51, the other first recessed portion 52, or the other second recessed portion 53. Nevertheless, the sleeve device can include only one radial hole 113, only one positioning member 40, only one first recessed portion 52, and only one second recessed portion 53.

Figure 10:
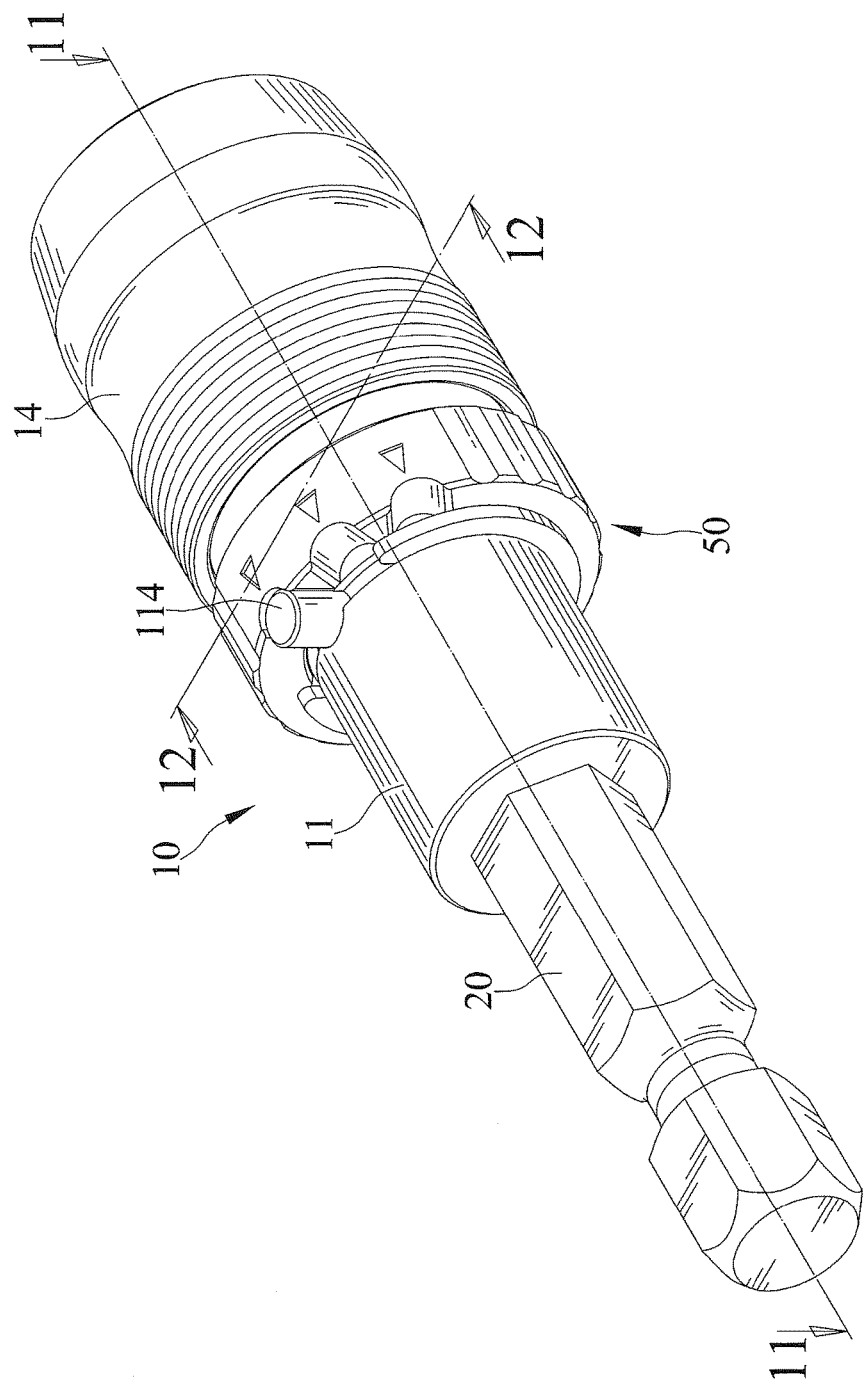
FIG. 10 is a perspective view of the sleeve device of FIG. 1, with the sleeve device being in a third position.
Figure 11:
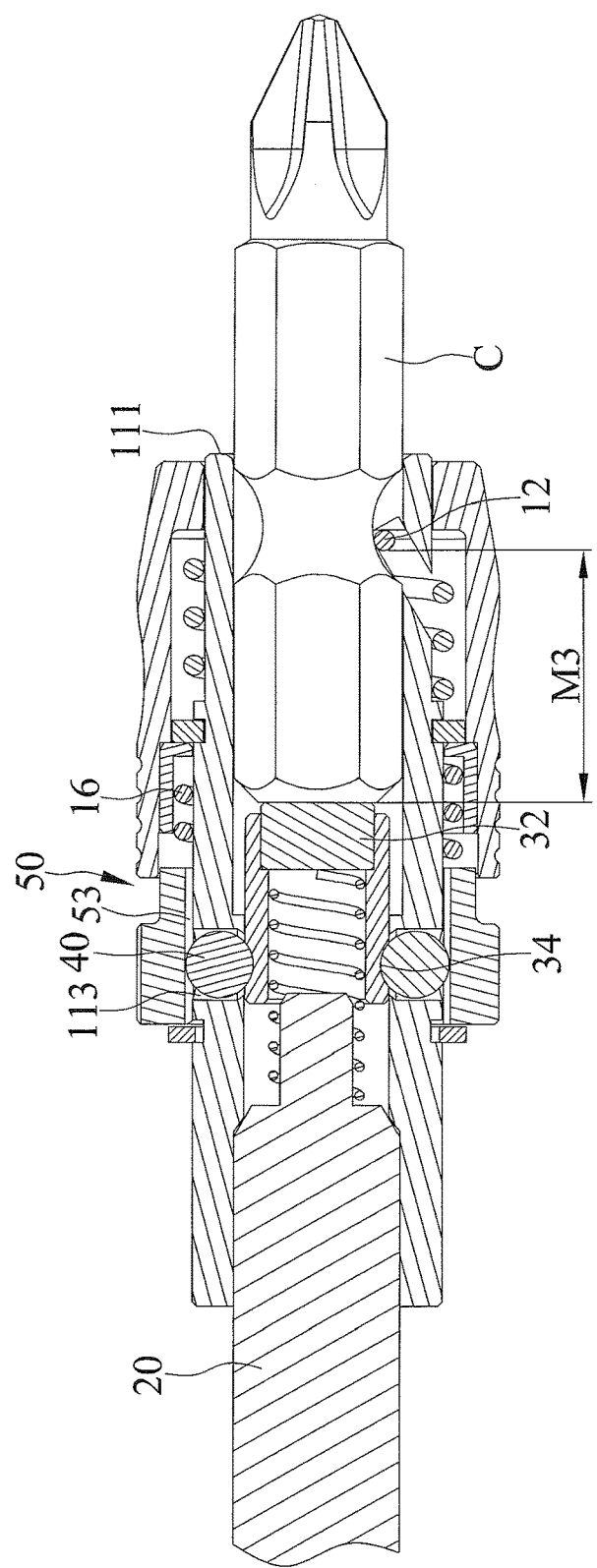
FIG. 11 is a cross sectional view taken along section line 11-11 of FIG. 10.
Figure 12:
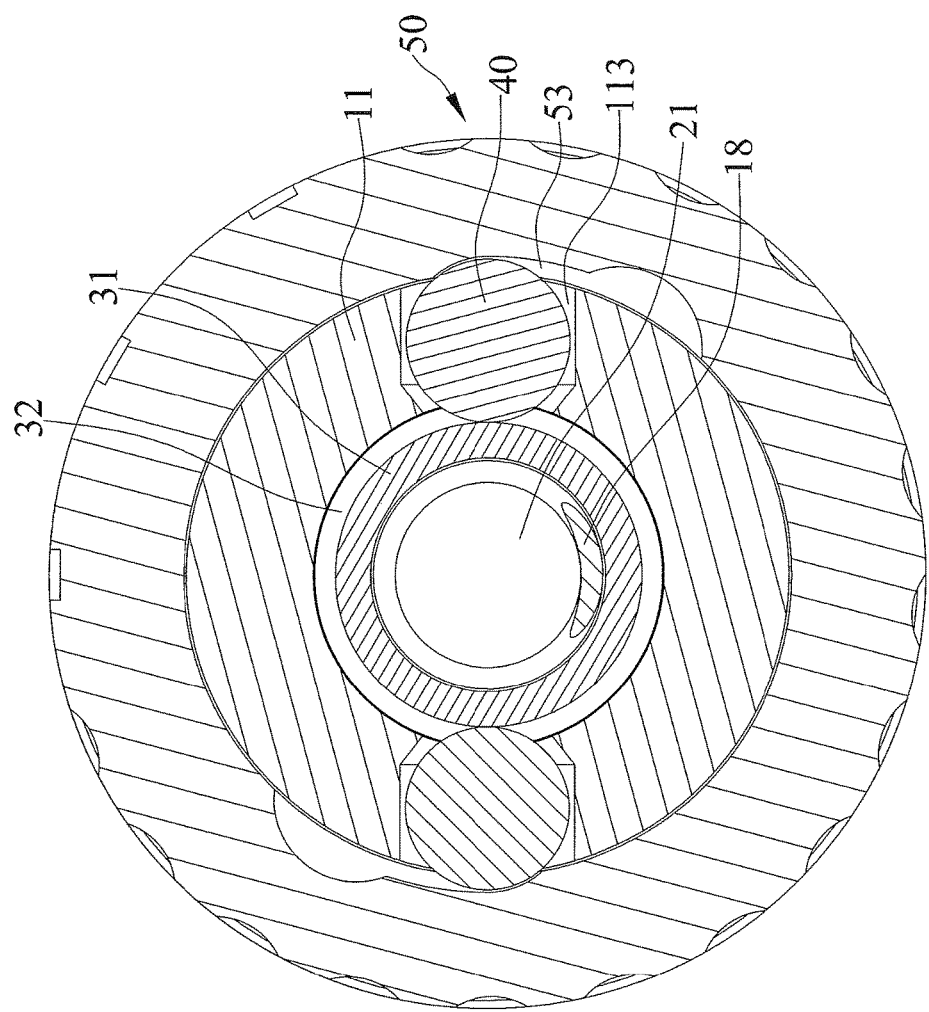
FIG. 12 is a cross sectional view taken along section line 12-12 of FIG. 10.

With reference to FIGS. 1, 2, and 5-12, the sleeve device is switchable between a first position (FIG. 1), a second position (FIG. 7), and a third position (FIG. 10). When the sleeve device is in the first position, the two first recessed portions 52 of the ring 50 cover the two radial holes 113, the positioning pin 114 is received in the first groove 54, and the two positioning members 40 are respectively pressed by the two first recessed portions 52 to press against the outer periphery of the cylindrical portion 31 of the pressing member 30. Furthermore, an end of the pressing member 30 adjacent to the pressing portion 33 presses against the fixing member 20. Furthermore, the cylindrical portion 31 receives the projection 21. The abutting portion 32 and the engaging member 12 have a first engagement depth M1 therebetween. A first bit A can be received in the sleeve device in the first position due to provision of the first engagement depth M1.

When it is desired to switch the sleeve device from the first position to the second position, the ring 50 is moved toward the open end face 111 of the sleeve 11, thereby disengaging the first groove 54 from the positioning pin 114. Next, the ring 50 is rotated relative to the sleeve 11 until the second groove 55 is aligned with the positioning pin 114. The ring 50 is biased by the first elastic element 16 to move toward the positioning pin 114. Thus, the positioning pin 114 is received in the second groove 55. When the sleeve device is in the second position, the inner periphery 51 of the ring 50 covers the two radial holes 113, the two positioning members 40 are pressed by the inner periphery 51 of the ring 50 to press against the pressing portion 33. The abutting portion 32 and the engaging member 12 have a second engagement depth M2 therebetween. The first engagement depth M1 is larger than the first engagement depth M2. A second bit B having a length smaller than that of the first bit A can be received in the sleeve device in the second position due to provision of the second engagement depth M2.

When it is desired to switch the sleeve device from the second position to the third position, the ring 50 is moved toward the open end face 111 of the sleeve 11, thereby disengaging the second groove 55 from the positioning pin 114. Next, the ring 50 is rotated relative to the sleeve 11 until the third groove 56 is aligned with the positioning pin 114. The ring 50 is biased by the first elastic element 16 to move toward the positioning pin 114. Thus, the positioning pin 114 is received in the third groove 56. When the sleeve device is in the third position, the two second recessed portions 53 of the ring 50 cover the two radial holes 113, the two positioning members 40 are pressed by the second recessed portion 53 of the ring 50 to engage with the groove 34 of the pressing member 30. The abutting portion 32 and the engaging member 12 have a third engagement depth M3 therebetween. The third engagement depth M3 is smaller than the first engagement depth M1 and is larger than the second engagement depth M2. A third bit C (having a length smaller than the length of the first bit A and larger than the length of the second bit B) can be received in the sleeve device in the third position due to provision of the third engagement depth M3.

Figure 13:
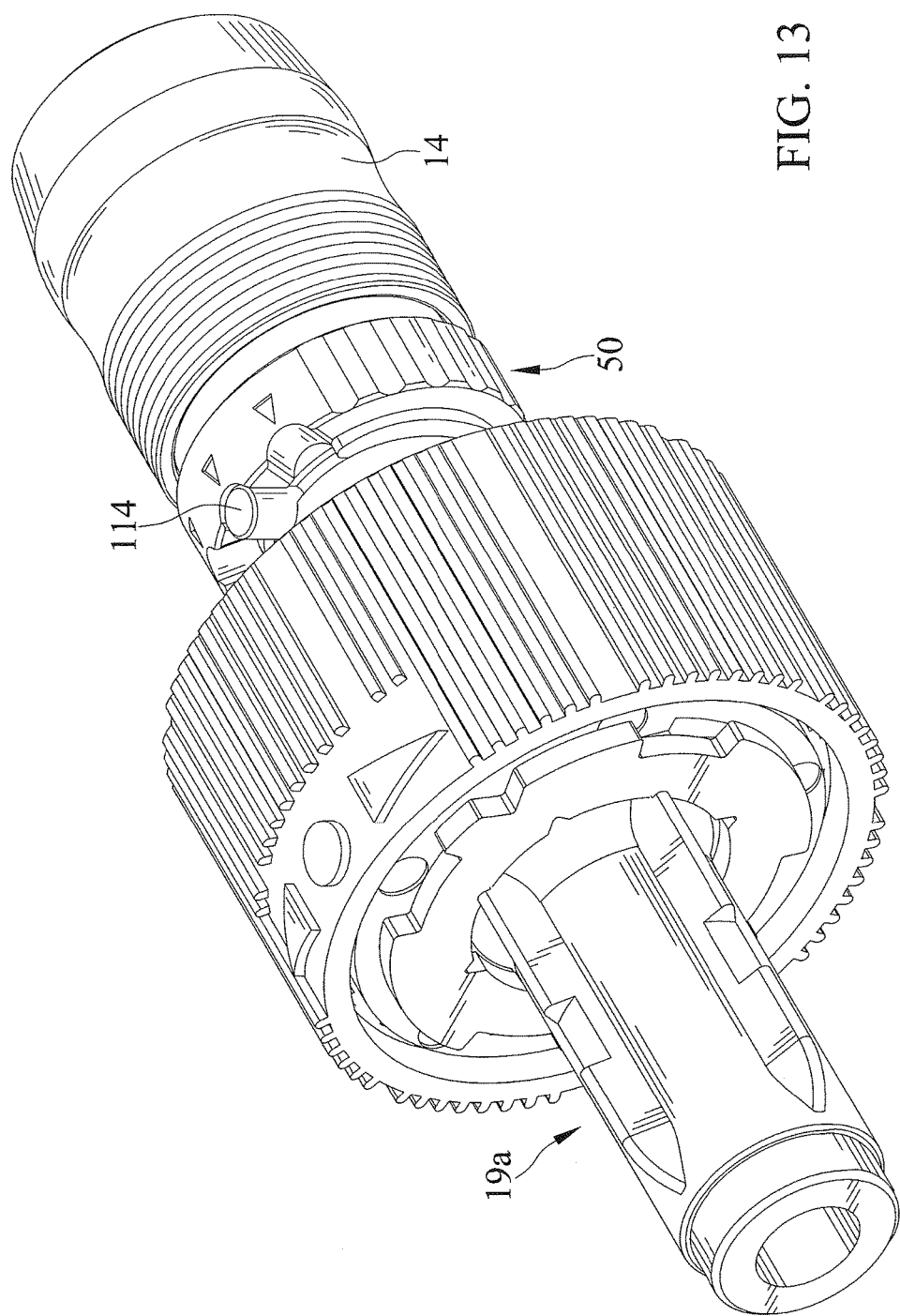
FIG. 13 is a perspective view of a sleeve device of a second embodiment according to the present invention.
Figure 14:
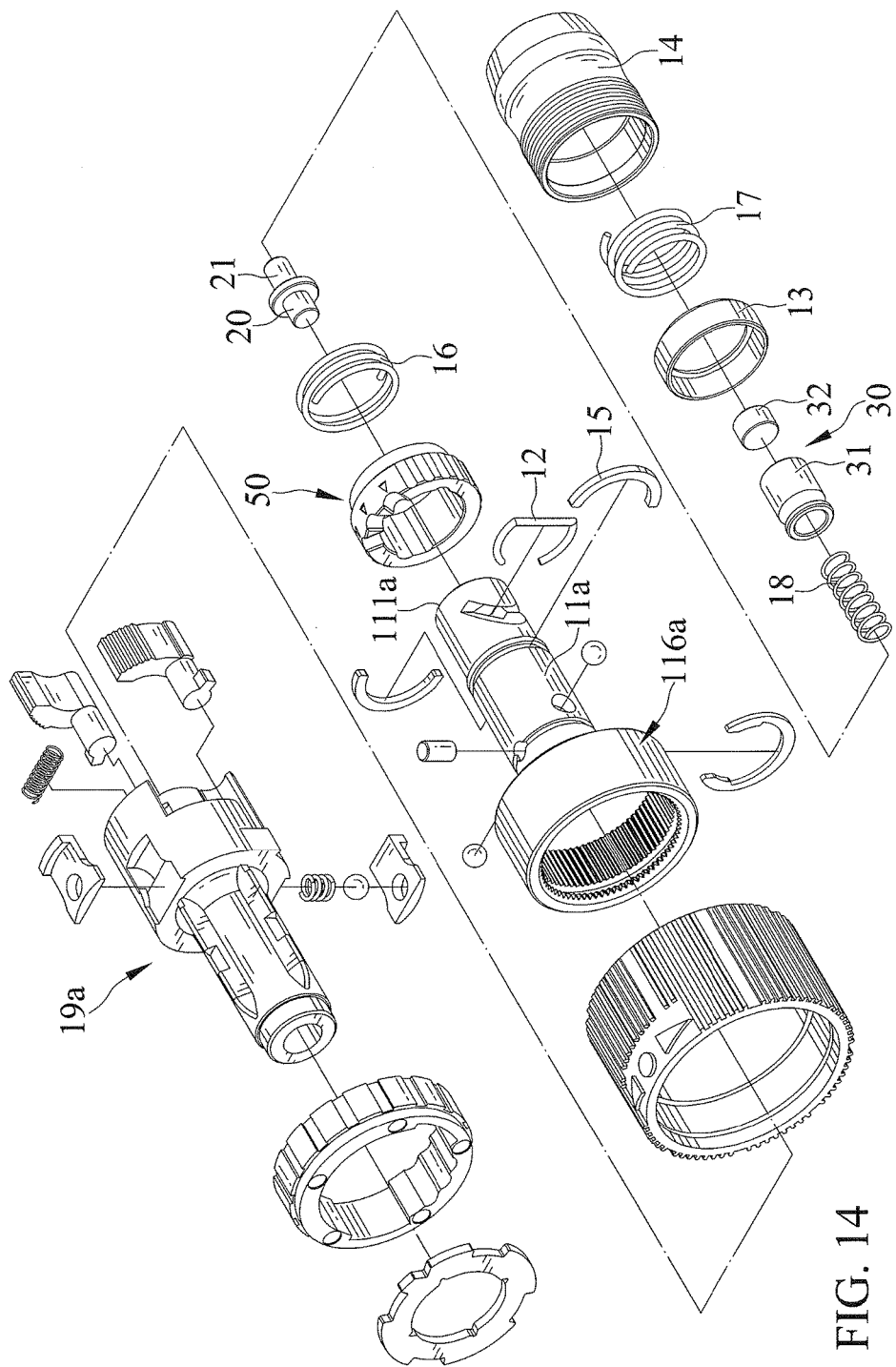
FIG. 14 is an exploded, perspective view of the sleeve device of FIG. 13.

FIGS. 13 and 14 show a sleeve device of a second embodiment substantially the same as the first embodiment in structure and operation. The differences between the second embodiment and the first embodiment are that the sleeve 11a includes a ratcheting portion 116a mounted to a second end of the sleeve 11a opposite to the first end having the open end face 111a, and the main unit 10 includes a ratcheting member 19a coupled to the ratcheting portion 116a and configured to rotate relative to the sleeve 11a. The ratcheting member 19a is configured to couple with a tool.

Although specific embodiments have been illustrated and described, numerous modifications and variations are still possible without departing from the scope of the invention. The scope of the invention is limited by the accompanying claims.

The invention claimed is:

1. A sleeve device for receiving bits comprising:

a main unit including a sleeve and an engaging member, wherein the sleeve includes an inner periphery defining a receiving space extending along a first axis, wherein the sleeve includes a first end having an open end face intercommunicating with the receiving space, wherein the sleeve further includes a radial hole extending from the inner periphery through an outer periphery of the sleeve in a radial direction perpendicular to the first axis and intercommunicating with the receiving space, wherein a bit is adapted to extend through the open end face into the receiving space, wherein the engaging member extends into the first end of the sleeve and is configured to engage with the bit;

a fixing member mounted to an end of the receiving space opposite to the open end face;

a pressing member slideably received in the receiving space, wherein the pressing member is configured to press against the fixing member, wherein the pressing member includes a cylindrical portion, an abutting portion, and a pressing portion, wherein the abutting portion and the pressing portion are disposed on two opposite ends of the cylindrical portion, wherein the abutting portion faces the open end face and is configured to abut the bit;

a positioning member slideably received in the radial hole, wherein the positioning member is configured to selectively press against an outer periphery of the cylindrical portion or the pressing portion;

a ring rotatably mounted around the sleeve, wherein the ring includes an inner periphery and a first recessed portion provided on the inner periphery, wherein the inner periphery and the first recessed portion are capable of abutting the positioning member, wherein the sleeve device is switchable between a first position and a second position, wherein when the sleeve device is in the first position, the first recessed portion of the ring covers the radial hole, the positioning member is pressed by the first recessed portion to press against the outer periphery of the cylindrical portion of the pressing member, wherein an end of the pressing member adjacent to the pressing portion presses against the fixing member, wherein the abutting portion and the engaging member have a first engagement depth therebetween, wherein when the sleeve device is in the second position, the inner periphery of the ring covers the radial hole, the positioning member is pressed by the inner periphery of the ring to press against the pressing portion, wherein the abutting portion and the engaging member have a second engagement depth therebetween, wherein the first engagement depth is larger than the first engagement depth.

2. The sleeve device for receiving bits as claimed in claim 1, wherein the pressing member includes a groove defined in the outer periphery of the cylindrical portion and located between the abutting portion and the pressing portion, wherein the ring further includes a second recessed portion, wherein the second recessed portion is disposed on the inner periphery and is configured to press against the positioning member, wherein the first recessed portion includes a first depth to the inner periphery of the ring in a radial direction perpendicular to the first axis, wherein the second recessed portion includes a second depth to the inner periphery of the ring in a radial direction perpendicular to the first axis, wherein the first depth is larger than the second depth, wherein the sleeve device is switchable between the first position, the second position and a third position, wherein when the sleeve device is in the third position, the second recessed portion of the ring covers the radial hole, the positioning member is pressed by the second recessed portion of the ring to engage with the groove of the pressing member, wherein the abutting portion and the engaging member have a third engagement depth therebetween, and wherein the third engagement depth is smaller than the first engagement depth and is larger than the second engagement depth.

3. The sleeve device for receiving bits as claimed in claim 2, wherein the ring further includes a first groove, a second groove, and a third groove, wherein the first, second, and third grooves extend in a longitudinal direction of the ring, wherein the sleeve includes a positioning pin, wherein the ring rotatable relative to the sleeve to selectively engage the positioning pin in one of the first, second, and third grooves, wherein the positioning pin is received in the first groove when the sleeve device is in the first position, wherein the positioning pin is received in the second groove when the sleeve device is in the second position, and wherein the positioning pin is received in the third groove when the sleeve device is in the third position.

4. The sleeve device for receiving bits as claimed in claim 3, wherein the main unit further includes a sliding member, a positioning ring, and a first elastic element, wherein the sliding member is slideably mounted around the sleeve, wherein the positioning ring is coupled to the outer periphery of the sleeve and is located at an end of the sliding member distant to the ring, wherein the first elastic element is mounted around the sleeve and is located between the sliding member and the ring, wherein the first elastic element elastically presses against the sliding member and the ring, wherein the ring elastically presses against the positioning pin, and wherein the sliding member elastically presses against the positioning ring.

5. The sleeve device for receiving bits as claimed in claim 4, wherein the sleeve includes a guiding slot intercommunicating with the receiving space and extending along a second axis at an angle to the first axis, wherein the angle is smaller than 90°, and wherein the engaging member slideably abuts a wall of the guiding slot and extends into the receiving space.

6. The sleeve device for receiving bits as claimed in claim 5, wherein the main unit further includes a jacket and a second elastic element, wherein the jacket includes an inner periphery defining a through-hole and a shoulder, wherein the through-hole extends from an end through another end of the jacket and slideably receives the sleeve, wherein the shoulder is provided on the inner periphery of the jacket and abuts the outer periphery of the sleeve, wherein the shoulder is configured to slide the engaging member relative to the guiding slot, wherein the second elastic element is mounted around the sleeve and is received in the through-hole of the jacket, wherein the second elastic element elastically presses against the shoulder, and wherein the sliding member is received in an end of the through-hole opposite to the shoulder.

7. The sleeve device for receiving bits as claimed in claim 6, wherein the sleeve includes a ratcheting portion mounted to a second end of the sleeve opposite to the first end of the sleeve, wherein the main unit includes a ratcheting member coupled to the ratcheting portion and configured to rotate relative to the sleeve, and wherein the ratcheting member is configured to couple with a tool.

8. The sleeve device for receiving bits as claimed in claim 5, wherein the sleeve includes a ratcheting portion mounted to a second end of the sleeve opposite to the first end of the sleeve, wherein the main unit includes a ratcheting member coupled to the ratcheting portion and configured to rotate relative to the sleeve, and wherein the ratcheting member is configured to couple with a tool.

9. The sleeve device for receiving bits as claimed in claim 4, wherein the sliding member includes a receiving groove surrounding the outer periphery of the sleeve, wherein an end of the sliding member adjacent to the receiving groove is configured to press against the ring, wherein the first elastic element is received in the receiving groove, wherein the main unit further includes a third elastic element, wherein the third elastic element is received in the receiving space of the sleeve and is located between the pressing member and the fixing member, and wherein the third elastic element elastically presses against the pressing member.

10. The sleeve device for receiving bits as claimed in claim 9, wherein the sleeve further includes a second end, wherein the receiving space extends from the first end through the second end of the sleeve, wherein the fixing member is a rod extending into the receiving space, wherein the fixing member is configured to couple with a tool and includes a projection extending toward the pressing member, wherein the third elastic element is mounted around the projection, and wherein the cylindrical portion of the pressing member is configured to receive the projection.

11. The sleeve device for receiving bits as claimed in claim 9, wherein the sleeve includes a ratcheting portion mounted to a second end of the sleeve opposite to the first end of the sleeve, wherein the main unit includes a ratcheting member coupled to the ratcheting portion and configured to rotate relative to the sleeve, and wherein the ratcheting member is configured to couple with a tool.

12. The sleeve device for receiving bits as claimed in claim 4, wherein the sleeve includes a ratcheting portion mounted to a second end of the sleeve opposite to the first end of the sleeve, wherein the main unit includes a ratcheting member coupled to the ratcheting portion and configured to rotate relative to the sleeve, and wherein the ratcheting member is configured to couple with a tool.

13. The sleeve device for receiving bits as claimed in claim 3, wherein the sleeve includes a ratcheting portion mounted to a second end of the sleeve opposite to the first end of the sleeve, wherein the main unit includes a ratcheting member coupled to the ratcheting portion and configured to rotate relative to the sleeve, and wherein the ratcheting member is configured to couple with a tool.

14. The sleeve device for receiving bits as claimed in claim 2, wherein the sleeve includes a ratcheting portion mounted to a second end of the sleeve opposite to the first end of the sleeve, wherein the main unit includes a ratcheting member coupled to the ratcheting portion and configured to rotate relative to the sleeve, and wherein the ratcheting member is configured to couple with a tool.

15. The sleeve device for receiving bits as claimed in claim 1, wherein the sleeve includes a ratcheting portion mounted to a second end of the sleeve opposite to the first end of the sleeve, wherein the main unit includes a ratcheting member coupled to the ratcheting portion and configured to rotate relative to the sleeve, and wherein the ratcheting member is configured to couple with a tool.

* * * * *